United States Patent
Lee

(10) Patent No.: US 6,805,570 B1
(45) Date of Patent: Oct. 19, 2004

(54) SUBSCRIBER IDENTITY MODULE CONNECTOR WITH COVER BOARD GROUNDING STRUCTURE

(75) Inventor: Ipson Lee, Taoyuan (TW)

(73) Assignee: Super Link Electronics Co., Ltd., Taoyuan (TW)

( * ) Notice: Subject to any disclaimer, the term of this patent is extended or adjusted under 35 U.S.C. 154(b) by 0 days.

(21) Appl. No.: 10/680,121

(22) Filed: Oct. 8, 2003

(51) Int. Cl.[7] .................................................. H01R 13/62
(52) U.S. Cl. ....................................... 439/326; 439/108
(58) Field of Search ............................... 439/326, 108, 439/630

(56) References Cited

U.S. PATENT DOCUMENTS

| | | | | |
|---|---|---|---|---|
| 5,749,741 A | * | 5/1998 | Bellas et al. ................. | 439/95 |
| 6,099,353 A | * | 8/2000 | Wu ............................ | 439/630 |
| 6,149,466 A | * | 11/2000 | Bricaud et al. ............. | 439/630 |
| 6,409,529 B1 | * | 6/2002 | Liu et al. .................... | 439/188 |
| 6,609,936 B2 | * | 8/2003 | Bricaud et al. ............. | 439/630 |

* cited by examiner

*Primary Examiner*—Phuong Dinh
(74) *Attorney, Agent, or Firm*—Rosenberg, Klein & Lee

(57) ABSTRACT

A SIM connector with cover board grounding structure includes a plastic main body formed with multiple terminal cavities in which multiple terminals are inlaid. At least one grounding plate has a first end being fitted on a lateral edge of the plastic main body. A second end of the grounding plate is soldered with a circuit board. The second end of the grounding plate being bent to form a first adjoining section. One side of a metal-made cover board is pivotally connected with a first end of the plastic main body. A second adjoining section projects from a lateral edge of the cover board. After the cover board covers the plastic main body, the cover board can be horizontally slid along guide pins of the plastic main body, making the second adjoining section of the cover board contact with the first adjoining section of the grounding plate.

3 Claims, 6 Drawing Sheets

SUBSCRIBER IDENTITY MODULE CONNECTOR WITH COVER BOARD GROUNDING STRUCTURE

BACKGROUND OF THE INVENTION

1. Field of the Invention

The present invention is related to a subscriber identity module (SIM) connector with cover board grounding structure, and more particularly to a SIM connector in which a grounding plate is connected between the cover board and the grounding circuit of a circuit board to form a grounding loop.

2. Description of the Prior Art

FIGS. 1 and 2 show a current subscriber identity module (SIM) connector applied to mobile phone. The SIM connector includes a plastic main body 91 and a cover board 92. Multiple terminals 911 are inlaid in the plastic main body 91. One end of the cover board 92 is pivotally connected with the plastic main body 91. A SIM card 93 can be placed in the plastic main body 91. The cover board 92 can be turned to cover the SIM card 93 and clamp the SIM card 93 together with the plastic main body 91. Accordingly, the SIM card 93 can be electrically connected with the terminals 911.

In use, when a user takes out the SIM card 93, the user needs to turn the cover board 92 upward with a finger. The cover board 92 has no proper grounding design so that at this time, the static on the human finger will instantaneously invade the SIM card 93 under the cover board 92. This is quite apt to cause damage of the SIM card 93.

SUMMARY OF THE INVENTION

It is therefore a primary object of the present invention to provide a SIM connector with cover board grounding structure, including: a plastic main body formed with multiple terminal cavities in which multiple terminals are inlaid; at least one grounding plate, a first end of the grounding plate being fitted on a lateral edge of the plastic main body, a bottom section of a second end of the grounding plate being soldered with a grounding circuit of a circuit board, a top section of the second end of the grounding plate being bent to form a first adjoining section; and a metal-made cover board. One end of the cover board is pivotally connected with a first end of the plastic main body. A second adjoining section projects from a lateral edge of the cover board. After the cover board covers the plastic main body, the cover board can be horizontally slid along guide pins of the plastic main body, making the second adjoining section of the cover board contact with the first adjoining section of the grounding plate so as to electrically connect with the grounding circuit of the circuit board.

The present invention can be best understood through the following description and accompanying drawings wherein:

DETAILED DESCRIPTION OF THE PREFERRED EMBODIMENT

Figure 1:
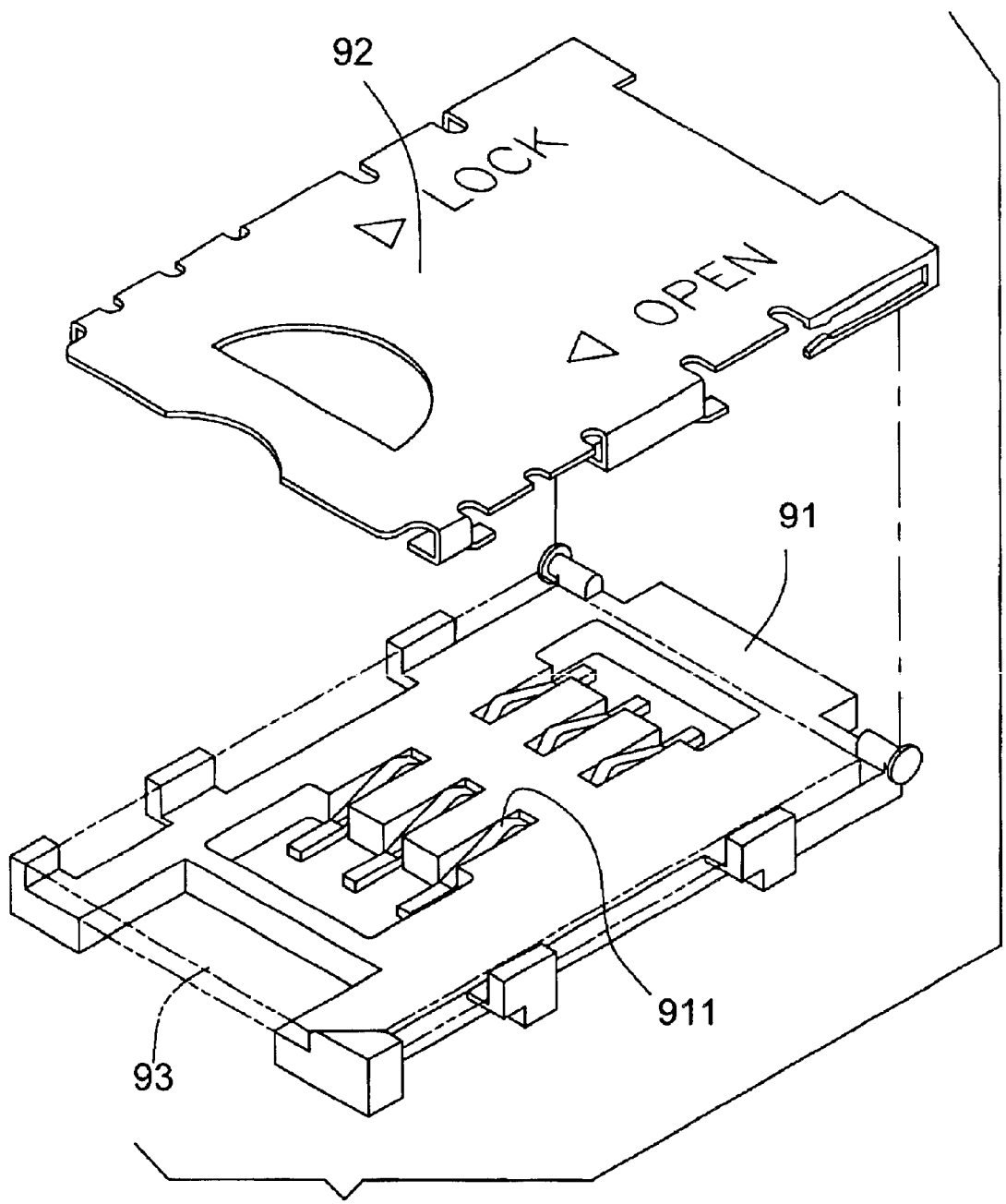
FIG. 1 is a perspective exploded view of a conventional SIM connector.
Figure 2:
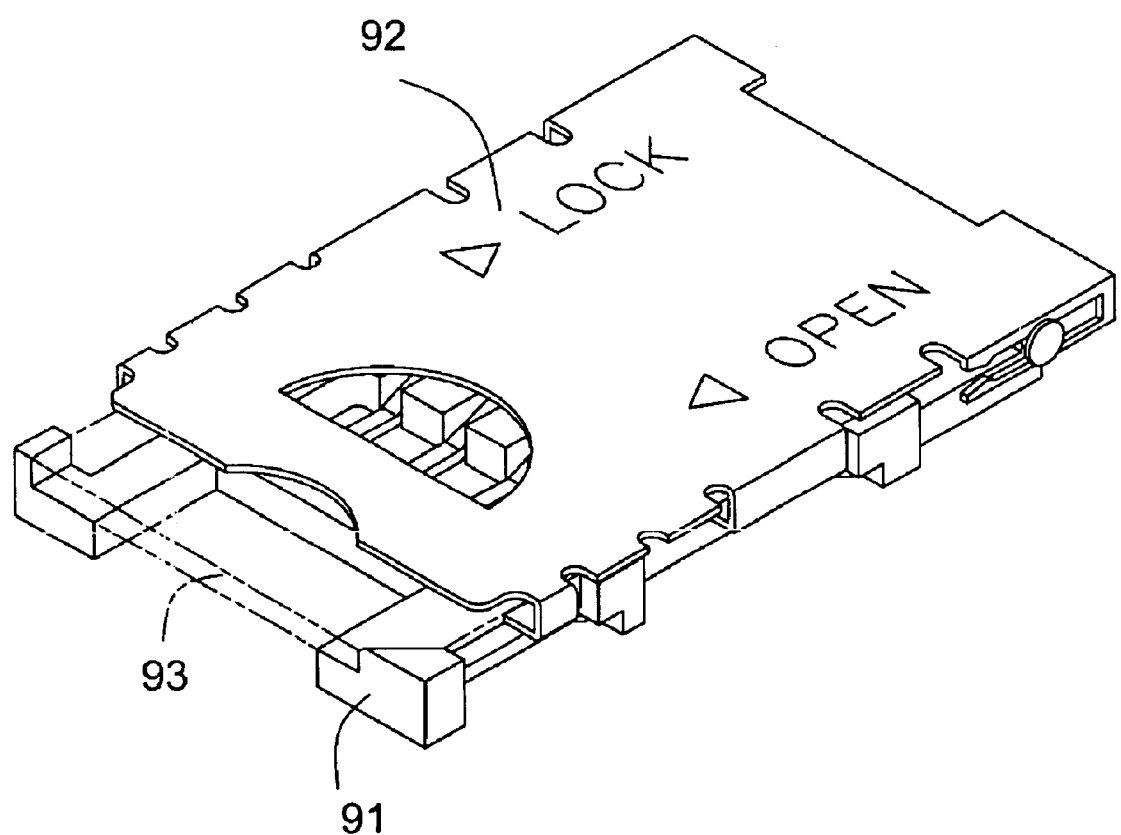
FIG. 2 is a perspective assembled view of the conventional SIM connector.

Please refer to FIGS. 3 to 7. The SIM connector of the present invention includes: a plastic main body 1 in which multiple terminals 1a are inlaid; at least one grounding plate 2 fitted on one side of the plastic main body 1, the grounding plate 2 being always connected with a grounding circuit of a circuit board 4, one end of the grounding plate 2 being formed with a first adjoining section 222; and a cover board 3, one end of the cover board 3 being pivotally connected with the plastic main body 1. At least one second adjoining section 31 is formed on a lateral edge of the cover board 3. When the cover board 3 is slid and latched on the plastic main body 1, the second adjoining section 31 is connected with the first adjoining section 222 of the grounding plate 2 to form an electrically conductive grounding circuit together with the circuit board 4.

Figure 3:
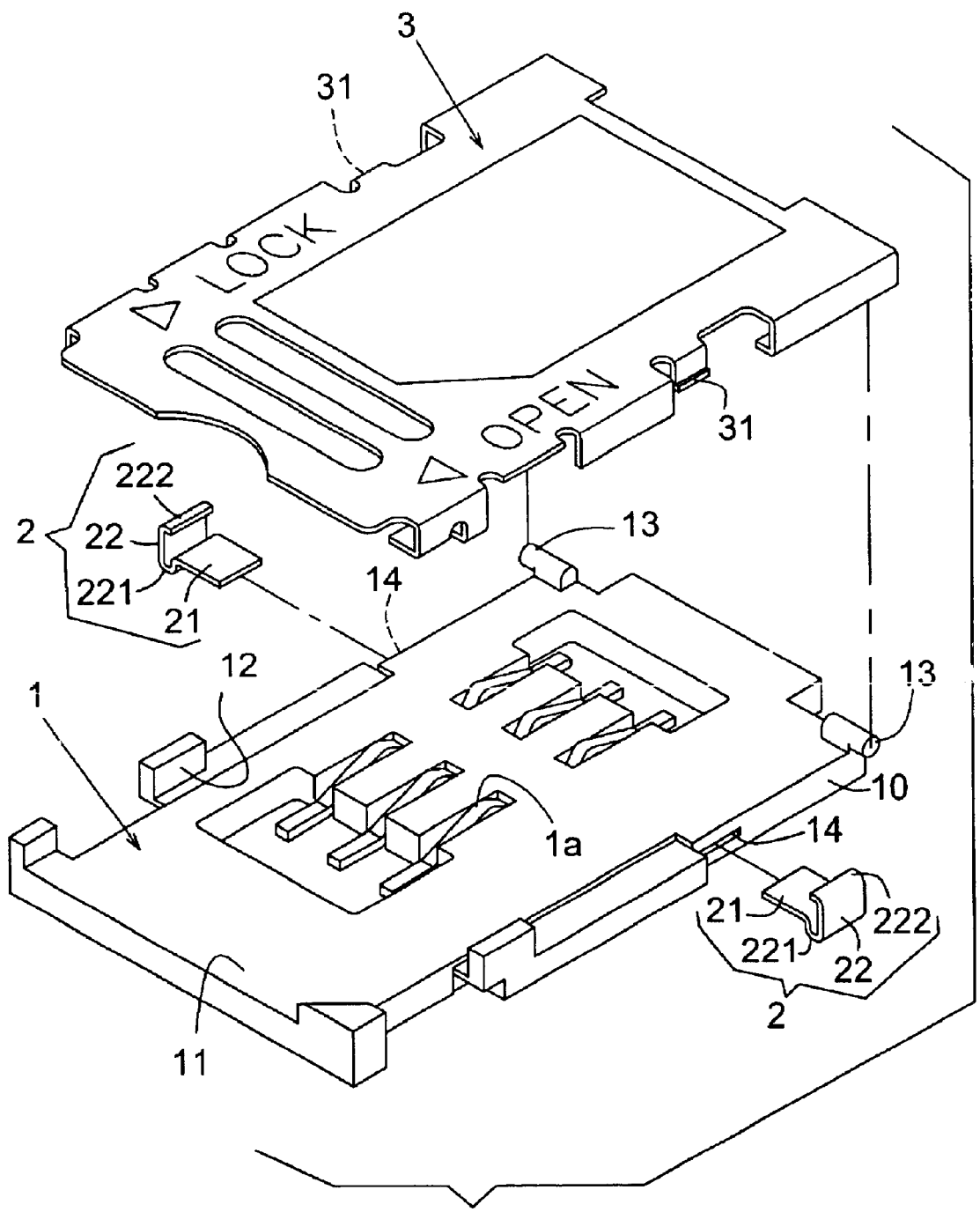
FIG. 3 is a perspective exploded view of the SIM connector of the present invention.
Figure 4:
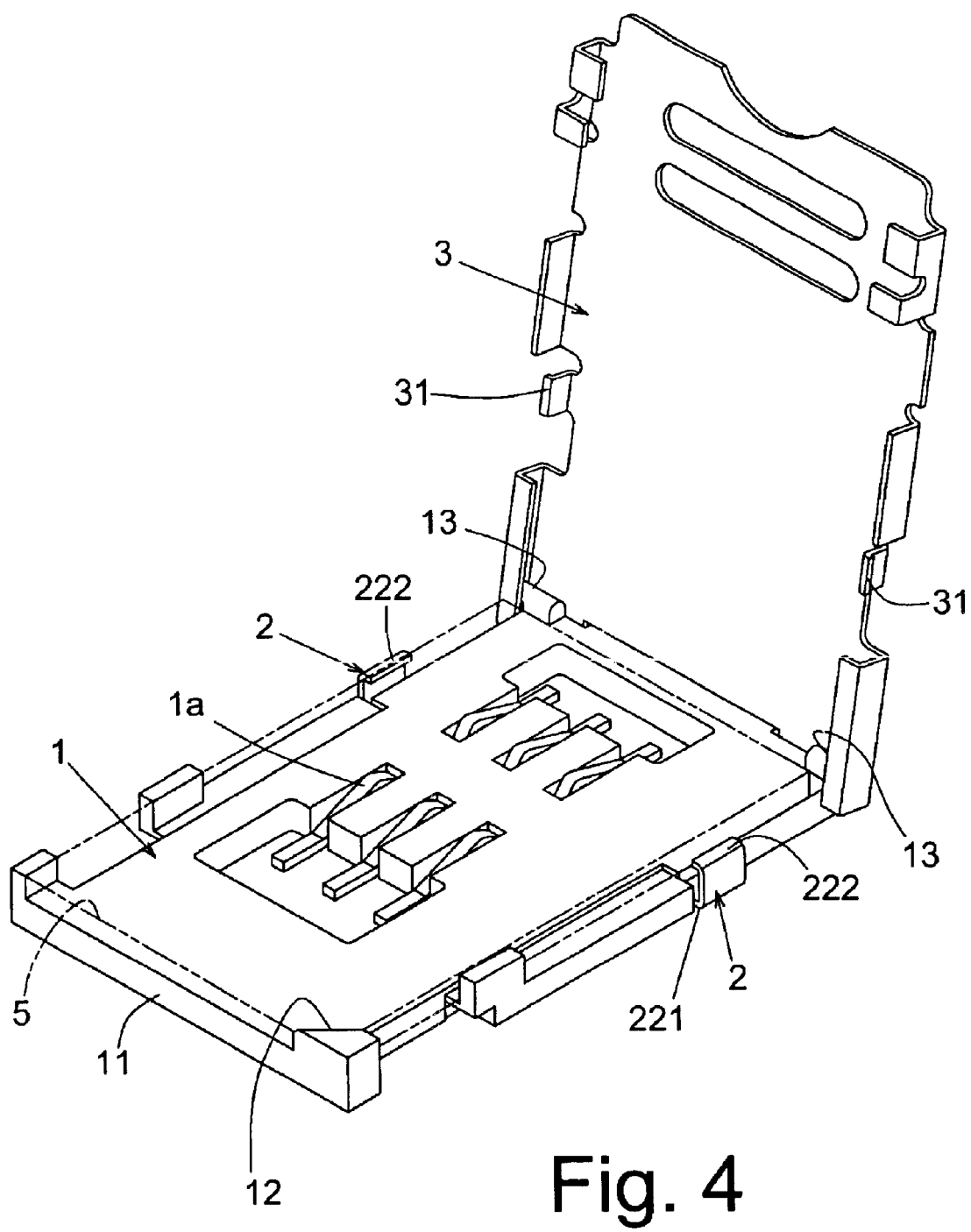
FIG. 4 is a perspective assembled view of the SIM connector of the present invention.
Figure 5:
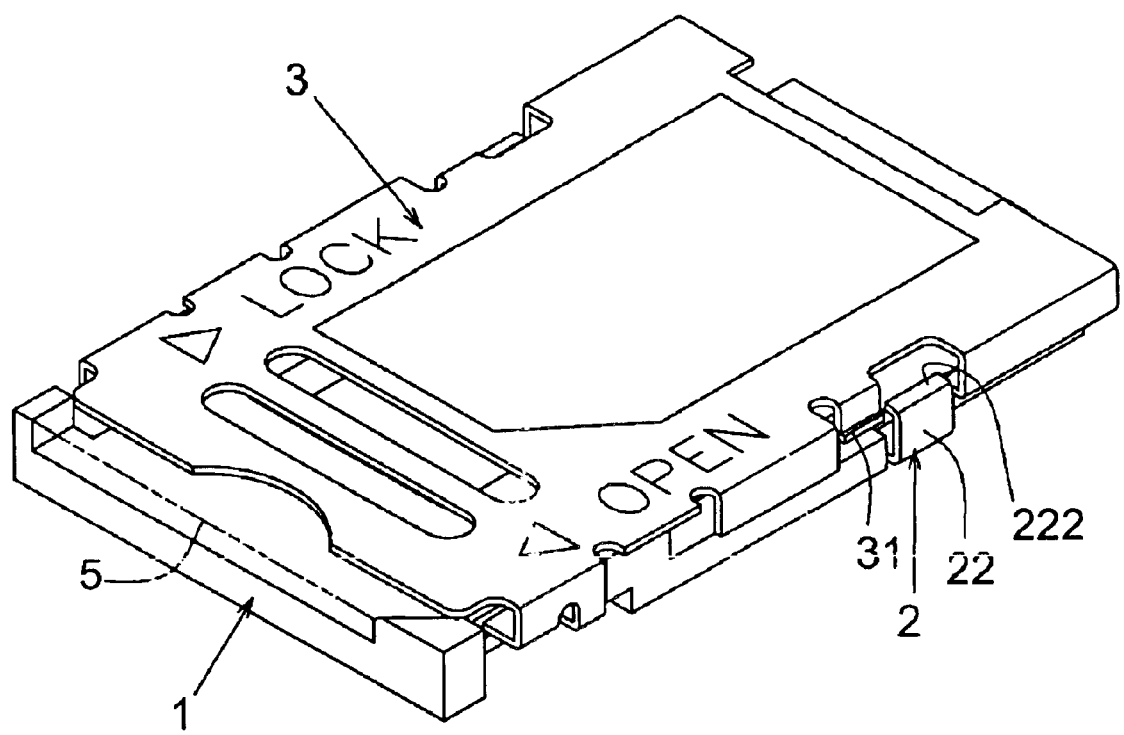
FIG. 5 is a perspective view showing that the cover board is latched on the plastic main body of the SIM connector of the present invention.
Figure 6:
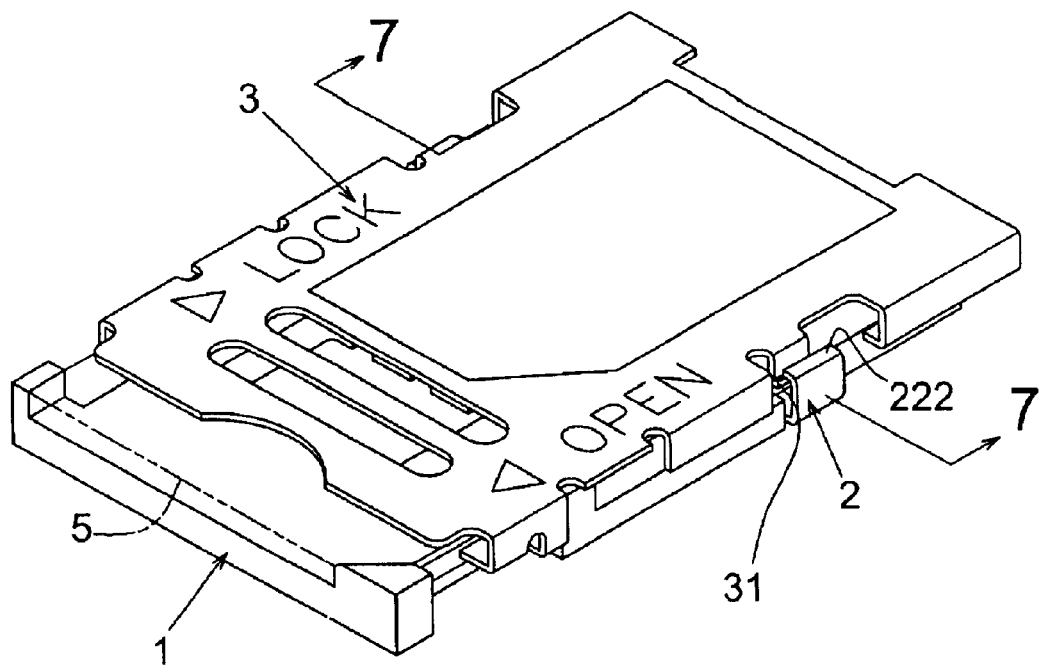
FIG. 6 is a perspective view according to FIG. 5, showing that the cover board is slid to connect with the grounding plate.
Figure 7:
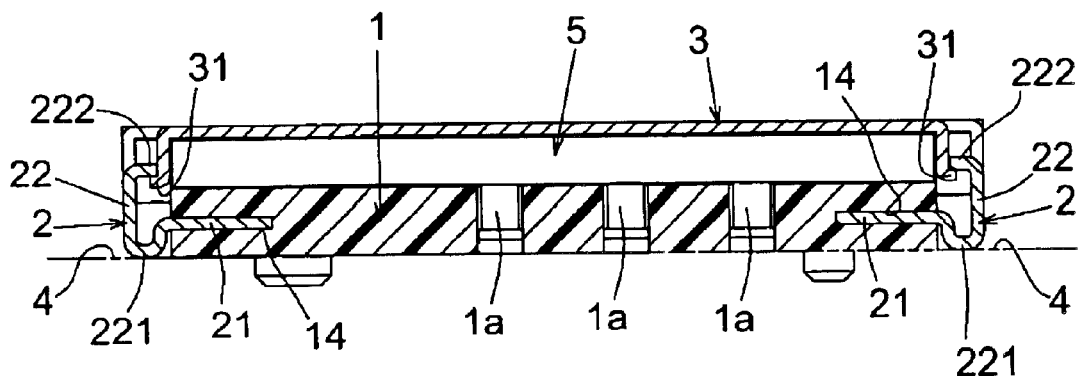
FIG. 7 is a sectional view taken along line 7—7 of FIG. 6.

Refining to FIGS. 3 and 4, the plastic main body 1 has a substrate 11. A receiving dent 12 is defined on the substrate 11, in which a SIM card 5 can be snugly accommodated in the receiving dent 12. Two sides of one end of the plastic main body 1 are respectively formed with two guide pins 13 for pivotally connecting with the cover board 3. At least one side 10 of the plastic main body 1 is formed with an insertion slit 14 in which a first end 21 of the grounding plate 2 is inserted.

The grounding plate 2 is made of metal board by integral punching. The first end 21 of the grounding plate 2 is formed as an insertion end which is tightly inserted in the insertion slit 14 of the plastic main body 1. A bottom section 221 of the second end 22 of the grounding plate 2 always electrically contacts with the grounding circuit of the circuit board 4. A top section of the second end 22 is formed with the first adjoining section 222.

The second end 22 of the grounding plate 2 is formed with a substantially C-shaped cross-section or the like. This is not limited.

Referring to FIG. 3, the cover board 3 is made of metal material. One end of the cover board 3 is pivotally connected with the guide pins 13 of the plastic main body 1. The second adjoining section 31 projects from the lateral edge of the cover board 3. After the cover board 3 is closed to cover the plastic main body 1, the cover board 3 can be horizontally slid along the guide pins 13 of the plastic main body 1 to firmly latch with the plastic main body 1. At this time, the second adjoining section 31 of the cover board 3 contacts with the first adjoining section 222 of the grounding plate 2 to electrically connect with the grounding circuit of the circuit board 4. Accordingly, the cover board 3 is grounded.

When the cover board 3 is latched on the plastic main body 1, the cover board 3 is always connected with the grounding circuit of the circuit board 4. Therefore, a user turns up the cover board 3 of the SIM connector with a finger, the static carried by the finger will be directly conducted to the grounding circuit of the circuit board 4 through the cover board 3. Therefore, the static on the finger will not lead to damage of the SIM card 5. In addition, the cover board 3 also serves to shield the SIM card 5 from interference of external electric wave.

The above embodiment is only used to illustrate the present invention, not intended to limit the scope thereof Many modifications of the above embodiment can be made without departing from the spirit of the present invention.

What is claimed is:

1. A subscriber identity module connector with cover board grounding structure, comprising:

(a) a plastic main body formed with multiple terminal cavities in which multiple terminals are inlaid;

(b) at least one grounding plate, a first end of the grounding plate being fitted on a lateral edge of the plastic main body, a bottom section of a second end of the grounding plate being always connected with a grounding circuit of a circuit board, a top section of the second end of the grounding plate being bent to form a first adjoining section; and (c) a cover board made of metal material, one end of the cover board being pivotally connected with a first end of the plastic main body, a second adjoining section projecting from a lateral edge of the cover board, whereby after the cover board covers the plastic main body, the cover board can be horizontally slid along guide pins of the plastic main body, making the second adjoining section of the cover board contact with the first adjoining section of the grounding plate so as to electrically connect with the grounding circuit of the circuit board.

2. The subscriber identity module connector with cover board grounding structure as claimed in claim 1, wherein said first end of the grounding plate is formed as an insertion end which can be tightly inserted in an insertion slit of one side of the plastic main body.

3. The subscriber identity module connector with cover board grounding structure as claimed in claim 1, wherein the second end of the grounding plate is formed with a substantially C-shaped cross-section.

* * * * *